United States Patent [19]
Inada et al.

[11] 3,883,185
[45] May 13, 1975

[54] ANTI-SKID CONTROL APPARATUS

[75] Inventors: Masami Inada, Aichigun; Toshiyuki Kondo, Toyota, both of Japan

[73] Assignee: Aisin Seiki Kabushiki Kaisha, Kariya, Japan

[22] Filed: June 28, 1973

[21] Appl. No.: 374,524

[30] Foreign Application Priority Data
  July 25, 1972 Japan.................... 47-74281

[52] U.S. Cl.............................. 303/21 F
[51] Int. Cl.............................. B60t 8/12
[58] Field of Search............ 303/21 F, 84 A, 21 AF; 188/181 R, 1 A; 340/52 C

[56] References Cited
UNITED STATES PATENTS

| | | | |
|---|---|---|---|
| 3,173,446 | 3/1965 | Mitchell | 340/52 C |
| 3,273,116 | 9/1966 | Quiros et al. | 303/84 A |
| 3,506,958 | 4/1970 | Kawabe | 340/52 C |
| 3,548,124 | 12/1970 | Tollerud | 188/1 A |
| 3,722,960 | 3/1973 | Menar | 303/21 AF |

*Primary Examiner*—Trygve M. Blix
*Assistant Examiner*—Charles E. Frankfort
*Attorney, Agent, or Firm*—Pierce, Scheffler & Parker

[57] ABSTRACT

An anti-skid control apparatus comprising a master cylinder, a plurality of brake wheel cylinders for fluid connection with the master cylinder, a plurality of sensors for detecting the number of rotations of vehicle wheels, an anti-skid fluid pressure control disposed within a fluid pressure circuit between the master cylinder and the wheel cylinders according to a signal from the sensors, a power fluid pressure source for actuating said anti-skid fluid pressure control, a control valve disposed between the anti-skid fluid pressure control and the power fluid pressure source for controlling the anti-skid fluid pressure control, and a cut valve disposed between the power fluid pressure source and the control valve and being off-state upon non-braking actuation.

6 Claims, 6 Drawing Figures

ANTI-SKID CONTROL APPARATUS

BACKGROUND OF THE INVENTION

This invention relates generally to vehicle brake systems and more particularly to vehicle brake systems having anti-skid controls therein.

In a conventional anti-skid device an anti-skid actuator is driven by a fluid power source, the brake pressure is controlled by utilizing an electromagnetic fluid pressure control valve for the anti-skid actuator and since the fluid pressure from the fluid power source is continuously supplied to the electromagnetic fluid pressure control valve, the fluid pressure may leak out from the electromagnetic fluid pressure control valve and the fluid pressure will be lost, adversely affecting the actuation of the anti-skid actuator. In order to prevent as far as possible leakage of the fluid pressure, it is necessary that the gap between a spool and a sleeve of the electromagnetic fluid pressure control valve be extremely fine, causing the manufacturing of the spool and the sleeve in the electromagnetic fluid pressure control valve to be difficult and critical and thus expensive.

SUMMARY OF THE INVENTION

Accordingly, it is an object of the present invention to provide an improved an anti-skid control system adapted for obviating the aforementioned drawbacks of conventional system.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DESCRIPTION OF THE ILLUSTRATED EMBODIMENTS

Figure 1:
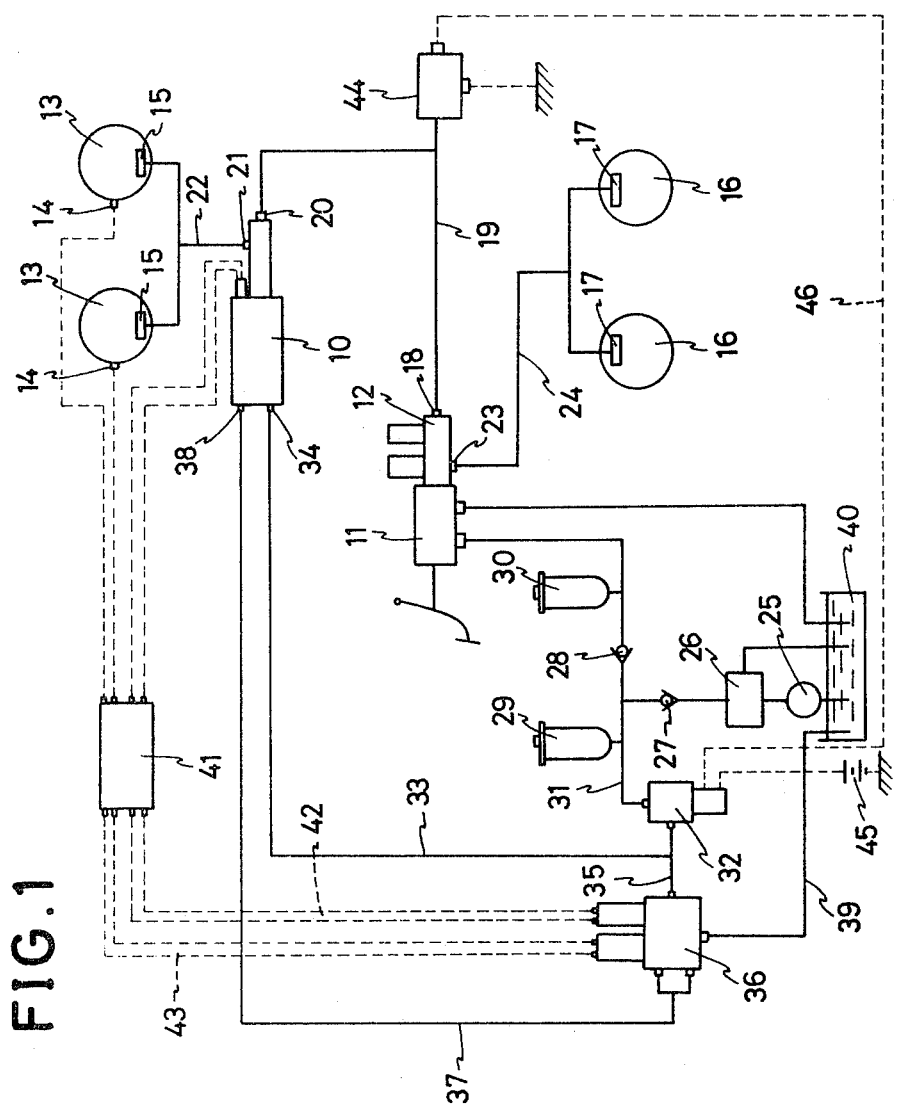
FIG. 1 is a schematic view of the anti-skid control system constructed according to this invention.

Referring now to the drawings, and more particularly to FIG. 1 thereof, the reference numeral 10 is a main body of an anti-skid actuator for increasing or decreasing the fluid pressure. A tandem master cylinder 12 is activated by a brake booster 11. Sensors 14, 14 for detecting the rotational state of rear wheels 13, 13 are attached to the rear wheels 13, 13 having wheel cylinders 15, 15, respectively. Front wheels 16, 16 have wheel cylinders 17, 17, respectively. A port 18 of the master cylinder 12 is fluidly connected with a port 20 of the actuator 10 via a conduit 19 and a port 21 of the actuator 10 with the rear wheel cylinders 15, 15 through a conduit 22. Another port 23 of the master cylinder 12 is fluidly communicated with the rear wheel cylinders 17, 17 via a conduit 24.

The reference numeral 25 is a pump and the discharged fluid pressure by the pump 25 is accumulated into accumulators 29, 30 through an unloader valve 26 and check valves 27, 28. The accumulator 30 may be a power source of the hydraulic brake booster 11 and the other accumulator 29 is fluidly communicated with a port 34 of the actuator 10 through a conduit 31 and a cut valve 32 and further a conduit 33. The cut valve 32 is fluidly connected with a port 38 of the actuator 10 through a conduit 35 and a control valve 36 and further a conduit 37. The control valve 36 is fluidly communicated with a reservoir 40 via a conduit 39. The reference numeral 41 is a computer for actuating the control valve 36 in response to a signal produced by the sensors 14, 14 through wires 42, 43. Within the conduit 19 a pressure switch 44 is disposed and when the fluid pressure of the conduit 19 arrives at a certain value, the pressure switch 44 may be off-state and the cut valve 32 may be on-state. An electric source 45 is electrically in series connected with the cut valve 32 and the pressure switch 44 through a wire 46.

Figure 5:
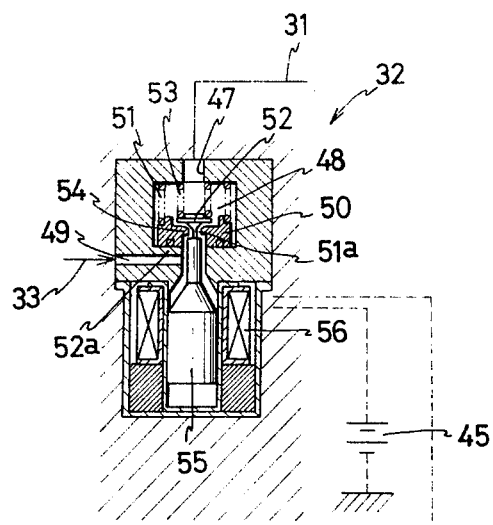
FIG. 5 is a similar view to FIG. 2, illustrating however, a cut valve utilized in the anti-skid control system of the invention disclosed in FIG. 1.

Referring now to FIG. 5, the cut valve 32 is interposed among the power source of the accumulator 29 and the actuator 10 and the control valve 36. A chamber 48 connected with a port 47 is connected with a port 49 which is fluidly communicated with the port 34 of the actuator 10 via the conduit 33. Further a port 49 is connected with the control valve 36 by the conduits 33, 35. A large diameter valve body 50 disposed within the chamber 48 is urged by a spring 51 in order to contact with a valve seat portion 52a. A passage 51a is formed on the large diameter valve body 50 for connecting the chamber 48 with the port 49. A small diameter valve body 52 is urged by a spring 53 so as to contact with a valve seat portion 54 of the large diameter valve body 50. A plunger 55 is connected with the small diameter valve body 52. When a coil 56 is electrically conducted, the plunger 55 is moved upwardly against the urging force of the spring 53 and the small diameter valve body 52 is left from the valve seat portion 54.

Figure 6:
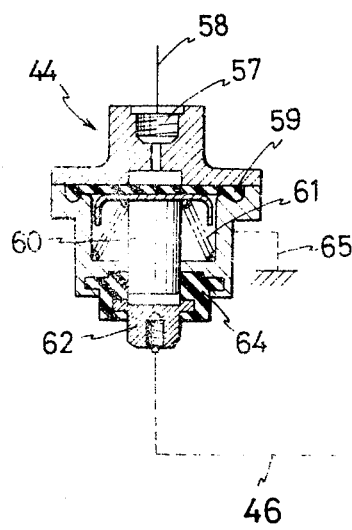
FIG. 6 is a similar view to FIG. 2, illustrating however, a pressure switch utilized in the anit-skid control system of the invention disclosed in FIG. 1.

Still referring to FIG. 6, a port 57 of the pressure switch 44 is fluidly communicated with the conduit 19 by a conduit 58. The reference numeral 59 is a diaphragm and a plunger 60 is urged by a spring 61 in order to contact the plunger 60 with the diaphragm 59. A plug 62 is electrically conducted with the coil 56 via a wire 63. An insulator 64 is provided to insulate the main body of the pressure switch 44 and the plug 62. The main body of the pressure switch 44 is earthed by a wire 65. When the fluid pressure is applied to the port 57 and overcomes the urging force by the spring 61, the plunger 60 is lowered and is contacted with the plug 62 and is electrically connected with the coil 56 of the cut valve 32.

Figure 2:
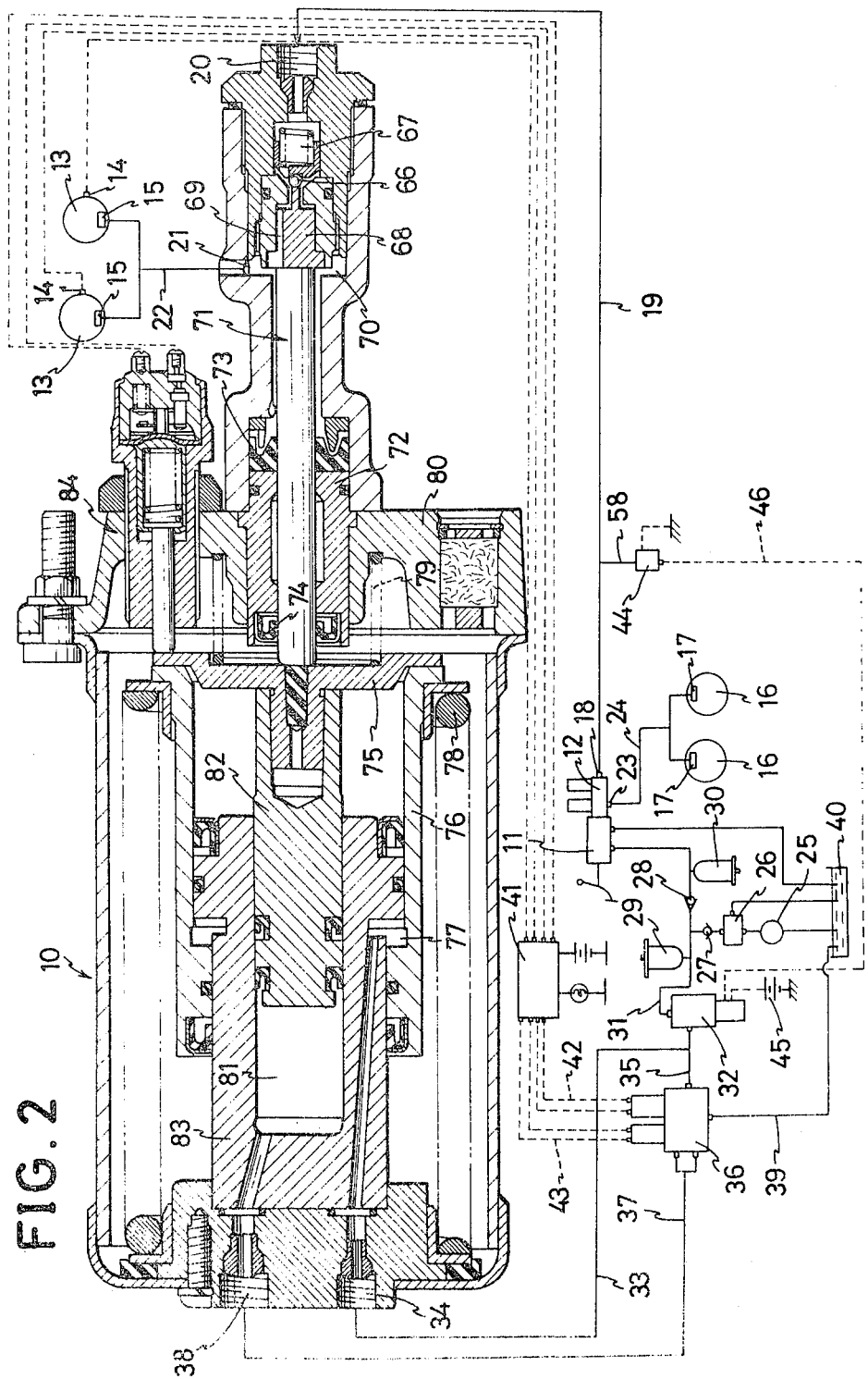
FIG. 2 is a sectional view of an actuator utilized in the anti-skid control system of the invention disclosed in FIG. 1.

Referring now to FIG. 2, the constitution of the actuator 10 will be described hereinbelow in detail. The port 20 is connected to an operating chamber 67 of a valve 66 and to a reduction chamber 70 through a passage 69 provided on an auxiliary plunger 68 and further to the port 21. A plunger 71 air-tightly exposed to the chamber 70 at one end thereof is contacted with the auxiliary plunger 68 and supported with a guide 72, seals 73, 74. And the other end of the plunger 71 is operatively connected with an auxiliary piston 75 which is operatively connected with a piston 76. By the fluid pressure within a chamber 77, the piston 76 is normally urged leftwardly against the biasing force of a spring 78 and when the fluid pressure within the chamber 77 is lost, the piston 76 operates to open the valve 66 by the biasing force of the spring 78 through the plunger 71. A spring 79 is interposed between the piston 75 and the shoulder of the main body 80 and the setting load of the spring 79 is enough large to smoothly move, even if the fluid pressure within a chamber 81 is lost upon anti-skid actuation and the fluid pressure within the chamber 70. The auxiliary piston 75 is operatively inserted into a piston 82 and is slidably positioned against a power cylinder 83 and construct the chamber 81. The chamber 81 is connected to the port 38 and the chamber 77 to the port 34, respectively. The reference numeral 84 is a detecting means for detecting the non-actuation of the piston 82 when the piston 82 should be actuated.

Figure 3:
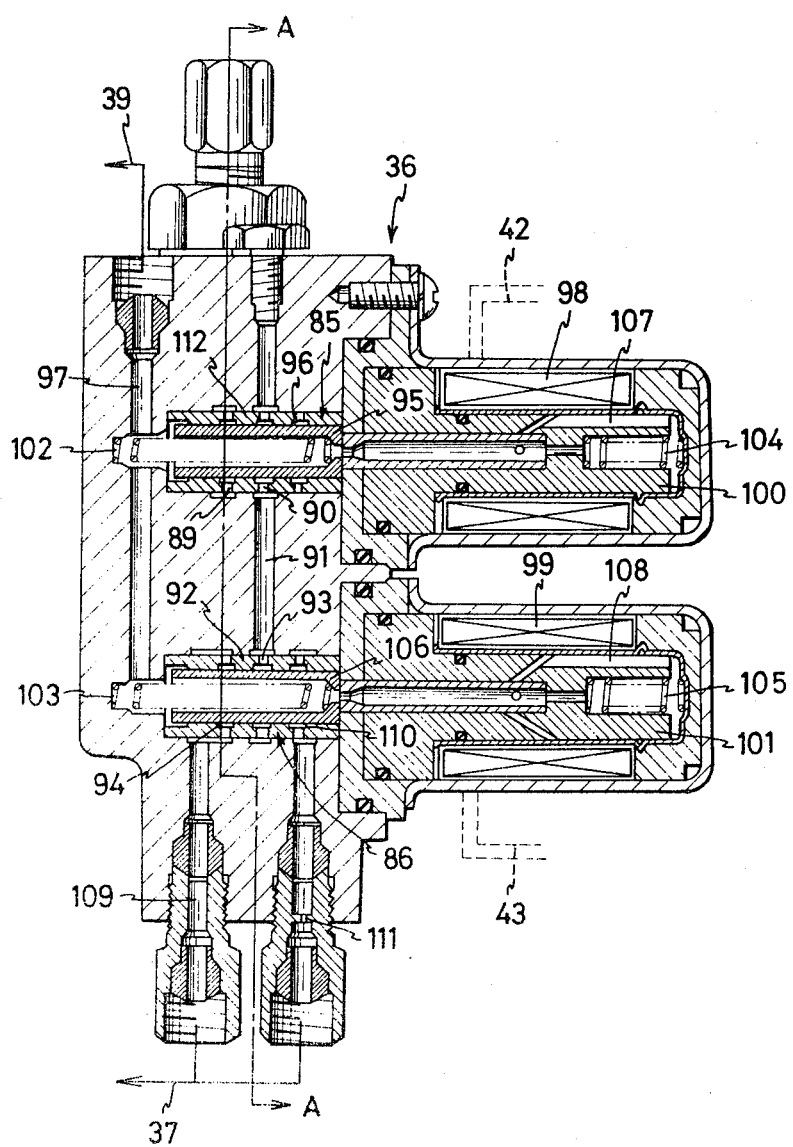
FIG. 3 is a view similar to FIG. 2, illustrating however, a control valve utilized in the anti-skid control system of the invention disclosed in FIG. 1.
Figure 4:
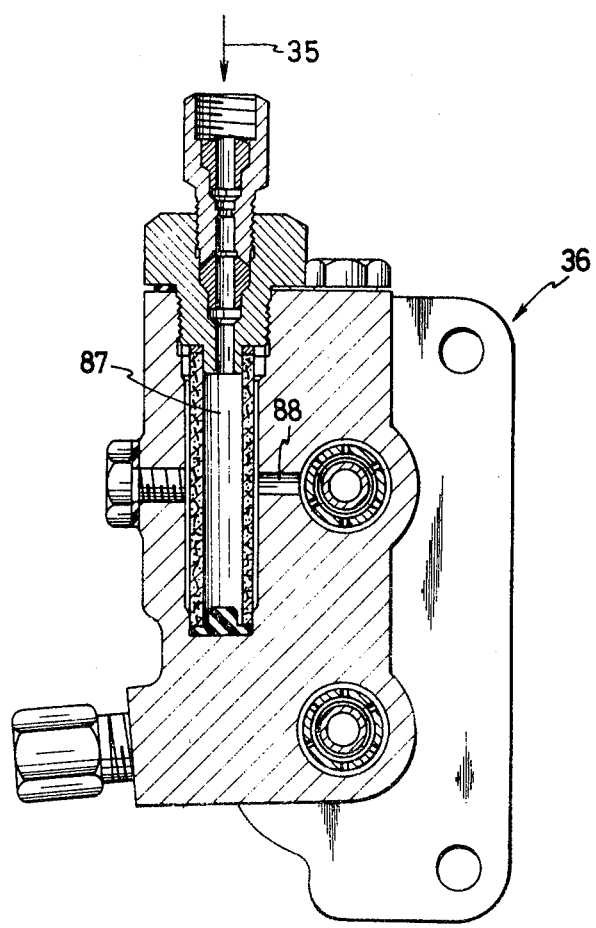
FIG. 4 is a view similar to FIG. 2 taken along the line A—A of FIG. 3.

Referring now to FIGS. 3, 4, the control valve 36 is provided with valves 85, 86 comprised in two spool type electromagnetic valve and the discharging fluid pressure from the pump 25 is transmitted to a port 89 provided on a sleeve 112 of the main valve 85 through the conduit 31, a filter 87 and a passage 88 and is connected to a port 90 upon non-operating state. The port 90 is communicated to a port 93 provided on a sleeve 92 of the valve 86 through a passage 91. The port 93 is communicated to a port 94 upon non-operating state. A hole 96 is supplied on a spool 95 of the main valve 85 and the hole 96 is fluidly communicated with the reservoir 40 by the conduit through a passage 97. Upon the operating state of the valve 85, the hole 96 is communicated with the port 90. When solenoids 98, 99 are excited in accordance with the signal of the computer 41, plungers 100, 101 overcome the difference between the forces of springs 102, 103 and the forces of springs 104, 105 (however, springs are setted as follows; 102>104>103>105) and the spool 95 a spool 106 are leftwardly moved and the valves 85, 86 will become operating state. Grooves 107, 108 are provided on the plungers 100, 101 and thereby the resistance by the fluid pressure becomes extremely small.

The operation of this invention will be described hereinbelow in detail. Upon non-braking operation, the fluid pressure from the master cylinder 12, namely, the fluid pressure within the conduit 19 is low pressure, so that the pressure switch 44 keeps the opening state. Accordingly, the cut valve 32 is the closing state and the fluid power pressure is cut by the cut valve 32, so that the control valve 36 and the actuator 10 are not activated. In this state upon braking operation the fluid pressure from the master cylinder 12 is transmitted to the front wheel cylinders 17, 17 via the port 23, the conduit 24 and the other fluid pressure from the master cylinder 12 is conveyed from the port 18 to the rear wheel cylinders 15, 15 through the port 19, the port 20 of the actuator 10, the valve 66, the reduction chamber 70, the port 21 and the conduit 22 and the front and rear wheels 13, 13 and 16, 16 are braked. When the fluid pressure from the master cylinder 12 is supplid to the conduit 19 at this time, the fluid pressure is applied to the port 57 of the pressure switch 44 through the conduits 19, 58 and also when this fluid pressure is attained to a predetermined valve (which is setted by the biasing force of the spring 61), the plunger 60 is lowered by the diaphragm 59 against the biasing force of the spring 61 and is contacted with the plug 62, therefore the pressure switch 44 may become closing state and the coil 56 of the cut valve 32 is electrified. When the coil 56 is electrified, the plunger 55 is upwardly moved and the small diameter valve body 51 connected to the plunger 55 is left from the valve seat portion 54. Thereby, when the fluid power pressure reaches to the port 49 through the conduit 31, the port 47, the chamber 48 and the passage 51a, the large diameter valve body 50 is upwardly moved and the large diameter valve body 50 is left from the valve seat portion 54. Thus, the ports 47, 49 are connected each other and the fluid power pressure is conveyed to the chamber 77 by the conduits 33, 35 through the port 34 of the actuator 10 and to the chamber 81 by the control valve 36 and the conduit 37 through the port 38. The actuator 10 is capable of actuation of the anti-skid. In the non-operating state of the valves 85, 86, when the rear wheels 16, 16 is about to lock, the solenoid 98 of the main valve 85 is excited by the signal of the computer 41 via the wire 42 and the spool 95 is leftwardly moved and thus the communication between the ports 89, 90 is cut off and the port 89 and hole 96 are communicated each other, so that the fluid pressure within the chamber 81 is connected to the reservoir 40 via the conduit 37, an orifice 109, the ports 94, 93, the passage 91, the port 90, the hole 96, the passage 97 and the conduit 39, and thus the force of the fluid pressure within the chamber 81 is almost lost and the plunger 71 is leftwardly moved by the brake fluid pressure within the chamber 70 and the valve 66 cuts off the brake fluid pressure circuit. Thereafter, by the leftward movement of the plunger 71 the fluid pressure of the wheel cylinders 15, 15 is decreased. When the lock of the rear wheels 13, 13 is released, the exciting of the solenoid 98 of the control valve 36 is again released by the signal of the computer 41 and the spool 95 is rightwardly moved by the difference force between the springs 102, 104 and thus the communication between the ports 89, 90 is attained and the communication between the port 90 and the hole 96 is closed. Accordingly, the chamber 81 of the actuator 10 is again connected with the accumulator and the plunger 71 is rightwardly moved by the increasing fluid pressure within the chamber 81. When the change of the speed of the fluid pressure actuation during the increasing or decreasing the fluid pressure is required on the anti-skid actuation in the actuation of the valve 86 of the control valve 36, the solenoid 99 of the valve 86 of the control valve 36 is excited by the signal of the computer 41 and the spool 106 is leftwardly moved as the main valve 85 and the communication between the ports 94, 93 is cut off and the ports 93, 110 are so connected that the fluid pressure between the passage 91 and the conduit 37 passes through the orifice 111 and the fluid quantity is changed and since the speed of the capacity change is changed, the speed of the change of the brake fluid pressure is changed in accordance with the change of speed of the capacity change.

It is described as an embodiment of this invention in which the cut valve 32 is actuated by the pressure switch 44 activated by the increasing of the fluid pressure of the master cylinder 12, however, it may construct that the pressure switch 44 is closed by the actuation of a brake pedal and the cut valve 32 is activated, and it may also construct that the cut valve 32 is directly pushed.

Further it may construct that when the wheels is about to cause the skid state, the cut valve 32 is opened by the signal of the computer 41.

Obviously, many changes and modifications of the present invention are possible in light of the foregoing teachings. It is to be understood, therefore, that within the scope of the appended claims, the invention may be practiced otherwise than as specifically described herein.

What is claimed is:

1. An apparatus for anti-skid brake pressure control in a hydraulic wheel brake system of an automotive vehicle with wheels comprising in combination:
   a master cylinder,
   a plurality of wheel brake cylinders,
   a fluid pressure circuit between said master cylinder and said wheel brake cylinders,
   a plurality of sensors for providing signals according to the number of rotations of said wheels,
   an anti-skid fluid pressure control means disposed within said fluid pressure circuit,
   a power fluid pressure source for actuating said anti-skid fluid pressure control means,
   a control valve means disposed between said anti-skid fluid pressure control means and said power fluid pressure source operable by the signals from said sensors for controlling said anti-skid fluid pressure control means, and
   a cut valve means disposed between said power fluid pressure source and said control valve means for interrupting fluid communication therebetween when no brake pressure is applied and for establishing fluid communication therebetween when the brake pressure exceeds a predetermined value.

2. Apparatus as claimed in claim 1 and further comprising a pressure switch means operable by the fluid pressure in said fluid pressure circuit and disposed between said master cylinder and anti-skid fluid pressure control means for controlling said cut valve means.

3. Apparatus as claimed in claim 2 wherein said cut valve means comprises a housing provided with a first port connected to said power fluid pressure source, a chamber communicating with said first port, a second port in said housing communicating with said anti-skid fluid pressure control means and said control valve means, a large diameter valve body disposed within said chamber, a first biasing means for urging said large diameter valve body against a first valve seat portion formed in said housing and having a passage therethrough connecting said chamber with said second port, said large diameter valve body being provided with a second valve seat portion, a small diameter valve body, a second biasing means for urging said small diameter valve body against the second valve seat portion of the large diameter valve body, a plunger connected to said small diameter valve body and means for urging said plunger against the force of said second biasing means to open said small diameter valve body, said last mentioned means being actuated by said pressure switch means.

4. Apparatus as claimed in claim 3 wherein said pressure switch means comprises a body portion, a casing provided with a port, said body portion and said casing forming a chamber, a plunger disposed within said chamber, a diaphragm operatively connected to said plunger and actuated by fluid pressure in said fluid pressure circuit, means for biasing said diaphragm, and means actuated by said plunger for actuating said cut valve means.

5. Apparatus as claimed in claim 1 wherein said control valve means includes spool valve means for controlling said anti-skid fluid pressure control means, said cut valve means preventing flow of fluid pressure to said spool valve means when no brake pressure is applied whereby operation of said anti-skid fluid pressure control means during non-braking operation by leakage of fluid pressure around said spool valve means is prevented.

6. Apparatus as claimed in claim 1 wherein said anti-skid fluid pressure control means comprises valve cut-off means, biasing means normally urging said valve cut-off means to the open position, a first hydraulic chamber directly communicating with said cut valve means, a second fluid chamber connected through said control valve means to said cut valve means, whereby fluid pressure from said cut valve means directly to said first chamber urges said valve cut-off means to close.

* * * * *